(12) United States Patent
Ha et al.

(10) Patent No.: US 6,490,724 B1
(45) Date of Patent: Dec. 3, 2002

(54) METHOD OF ANALYZING/SEARCHING USER'S VIEWING HABIT REGARDING AERIAL BROADCASTING

(75) Inventors: Young-Ho Ha, Daeku (KR); Dong-Hyeon Kim, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/258,353

(22) Filed: Feb. 26, 1999

(30) Foreign Application Priority Data

Feb. 27, 1998 (KR) .............................................. 98-6385

(51) Int. Cl.[7] .............................. H04N 5/44; H04N 9/00; H04N 5/445; H04N 7/16; G06F 3/00; G06F 13/00
(52) U.S. Cl. .................................. 725/9; 725/9; 725/13; 725/14; 725/46; 348/734; 348/553
(58) Field of Search ................................. 725/13, 14, 9, 725/45, 46; 348/734, 565, 553, 731

(56) References Cited

U.S. PATENT DOCUMENTS

| | | | | |
|---|---|---|---|---|
| 4,954,899 A | * | 9/1990 | Tanabe et al. ................. | 725/14 |
| 5,153,580 A | * | 10/1992 | Pollack ................... | 340/309.15 |
| 5,194,951 A | * | 3/1993 | Hailey et al. ................ | 348/581 |
| 5,444,499 A | * | 8/1995 | Saitoh ......................... | 348/734 |
| 5,465,385 A | * | 11/1995 | Ohga et al. ..................... | 725/58 |
| 5,477,262 A | * | 12/1995 | Banker et al. ................. | 725/38 |
| 5,497,185 A | * | 3/1996 | Dufresne et al. .............. | 725/11 |
| 5,517,254 A | * | 5/1996 | Monta et al. ................ | 348/468 |
| 5,585,838 A | * | 12/1996 | Lawler et al. ................. | 725/54 |
| 5,585,865 A | * | 12/1996 | Amano et al. ................. | 725/14 |
| 5,734,444 A | * | 3/1998 | Yoshinobu ................... | 348/734 |
| 5,801,747 A | * | 9/1998 | Bedard ......................... | 725/13 |
| 5,867,205 A | * | 2/1999 | Harrison ....................... | 725/38 |
| 5,867,226 A | * | 2/1999 | Wehmeyer et al. .......... | 348/569 |
| 5,894,331 A | * | 4/1999 | Yang ............................ | 348/740 |
| 5,973,680 A | * | 10/1999 | Ueda ............................ | 345/721 |
| 5,977,964 A | * | 11/1999 | Williams et al. ............. | 345/721 |
| 6,075,526 A | * | 6/2000 | Rothmuller ................... | 345/721 |
| 6,088,722 A | * | 7/2000 | Herz et al. ................... | 709/217 |
| 6,133,909 A | * | 10/2000 | Schein et al. ................ | 345/721 |

* cited by examiner

*Primary Examiner*—Andrew Faile
*Assistant Examiner*—Jason Salce
(74) *Attorney, Agent, or Firm*—Birch, Stewart, Kolasch & Birch, LLP (57) ABSTRACT

A method of analyzing/searching a user's viewing habit regarding aerial broadcasting includes the steps of comparing a present time and channel with a habit database per predetermined time period, checking whether a present habit channel is viewed in case the present time is a time corresponding to the habit, terminating the operation when the habit channel is viewed and showing channel information corresponding to the habit by a PIP screen, displaying a message asking whether it is converted to the habit channel after showing the channel information, converting the channel to a channel by a user's selection, checking a habit function key input when the habit channel is viewed, adjusting the presently viewed channel or other channels and channel conversion time in accordance with the user's selection when the habit function key is inputted and reserving the result in the habit database. The method enables a TV set to provide a user with his or her habit information by analyzing/comparing habit data, present time and viewing channel per a predetermined time period, thereby maximizing the user's convenience.

6 Claims, 10 Drawing Sheets

| HOUR | MINUTE | CHANNEL | VIEWING FREQUENCY NUMBER | RESERVATION FLAG | VIEWING TIME PERIOD | VOLUME INFORMATION | IMAGE INFORMATION |
|------|--------|---------|--------------------------|------------------|---------------------|--------------------|-------------------|

```
┌─────────────────────────────────────────────────────────┐
│  HABIT INFORMATION                                       │
│  HABIT'1 : 7:10 P.M., MONDAY, CHANNEL 30, VOLUME 30      │
│  HABIT'2 : 10:30 P.M., MONDAY, CHANNEL 12, VOLUME 15     │
│  ⋮                                                        │
└─────────────────────────────────────────────────────────┘

SELECT: ⇕   MODIFY: ◁▷ · END: ☐
```

```
┌─────────────────────────────────────────────────────────┐
│  HABIT INFORMATION                                       │
│  HABIT'1 : 7:10 P.M., MONDAY, CHANNEL 30 VOLUME 30       │
│  HABIT'2 : 10:30 P.M., MONDAY CHANNEL 12, VOLUME 15      │
│           ┌──────────────────────────────────────┐       │
│           │ HABIT'2 : 10:30 P.M., MONDAY CHANNEL12,│      │
│           │              VOLUME 15                │       │
│           └──────────────────────────────────────┘       │
└─────────────────────────────────────────────────────────┘

SELECT: ⇕   ADJUST: ◁▷  END: ☐
```

FIG. 12

METHOD OF ANALYZING/SEARCHING USER'S VIEWING HABIT REGARDING AERIAL BROADCASTING

BACKGROUND OF THE INVENTION

1. Field of the Invention

The present invention relates to a method of analyzing/searching a user's viewing habit regarding aerial broadcasting so as to provide information with regard to a user's habit, and more particularly, to an improved method of analyzing/searching a user's viewing habit regarding aerial broadcasting wherein a user's weekly viewing habit pattern is self-analyzed and databased so that channel information corresponding to a user's habit at a corresponding day of the week and a corresponding time of the day is provided to the user, thereby maximizing a user's convenience.

2. Description of the Background Art

In the conventional art which varies to an automatic channel selection and a timer device, a microcomputer in a TV set produces an turn-on/off time of TV and a frequently viewed channel of the user and the result is set in memory. When the automatic timer is selected, the turn-on/off operation is implemented to the produced channel at the corresponding time, which is regarded as frequently viewed.

That is, the user's viewing habit pattern itself is recognized and the TV is channel-converted at a corresponding time according to the viewer's habit.

However, although the conventional art only provides convenience that channels are directly converted corresponding to the user's habit, the viewing habit pattern is not recognized by the user when providing information corresponding to the user's habit.

SUMMARY OF THE INVENTION

The present invention is directed to overcoming the conventional disadvantages.

Accordingly, it is an object of the present invention to provide a method of 10 analyzing/searching a user's viewing habit regarding aerial broadcasting so as to maximize user's convenience wherein a TV set provides a user with his or her habit information by analyzing/comparing habit data, present time and viewing channel per a predetermined time period after databasing a user's habit pattern by analyzing a user's viewing habit from a user's viewing channel, channel switching time, viewing time period of the channel, etc.

To achieve the above-described object, there is provided a method of analyzing/searching a user's viewing habit regarding aerial broadcasting according to the present invention which includes a first step for comparing a present time and channel with a habit database per predetermined time period, a second step for checking whether a present habit channel is viewed in case the present time at the first step is a time corresponding to the habit, a third step for terminating the operation when the habit channel is viewed and showing channel information corresponding to the habit by a PIP screen when the habit channel is not viewed in the second step, a fourth step for displaying a message asking whether it is converted to the habit channel after showing the channel information at the third step, a fifth step for converting the channel at the fourth step to a channel by a user's selection, a sixth channel for checking a habit function key input when the habit channel is viewed in the second step, and a seventh step for adjusting the presently viewed channel or other channels and channel conversion time in accordance with the user's selection when the habit function key is inputted and reserving the result in the habit database.

Further, to achieve the above-described object, there is provided a method of analyzing/searching a user's viewing habit regarding aerial broadcasting according to the present invention which includes a first step for displaying a habit channel by turning on TV at a time corresponding to the habit, a second step for displaying channel information corresponding to the habit after displaying the habit channel, a third step for displaying a message asking whether to continuously view, and a fourth step for maintaining the turned-on state of the habit channel in accordance with the user's selection or turning off TV.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the method of analyzing/searching a user's viewing habit regarding aerial broadcasting according to the present invention will now be described.

Figure 1:
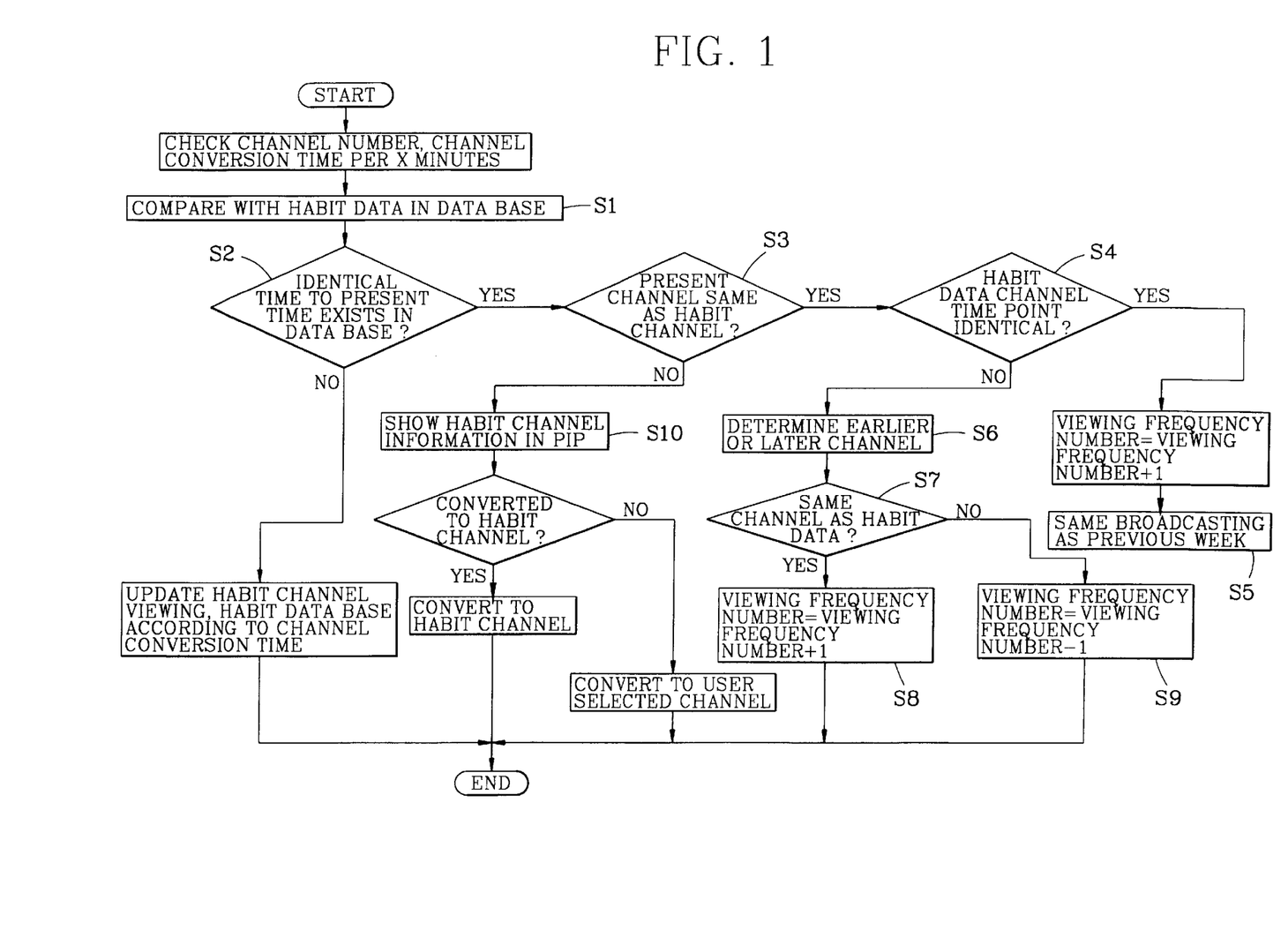
FIGS. 1 and 2 are flow charts respectively illustrating a method of analyzing/searching a user's viewing habit regarding aerial broadcasting according to the present invention.

FIG. 1 shows a flow chart illustrating a method of analyzing/searching a user's viewing habit regarding aerial broadcasting according to the present invention. As shown therein, the method includes a first step for comparing a present time and channel with a habit database per predetermined time period, a second step for checking whether a present habit channel is viewed in case the present time at the first step is a time corresponding to the habit, a third step for terminating the operation when the habit channel is viewed and showing channel information corresponding to the habit by a PIP screen when the habit channel is not viewed in the second step, a fourth step for displaying a message asking whether it is converted to the habit channel after showing the channel information at the third step, a fifth step for converting the channel at the fourth step to a channel by a user's selection, a sixth channel for checking a habit function key input when the habit channel is viewed in the second step, and a seventh step for adjusting the presently viewed channel or other channels and channel conversion time in accordance with the user's selection when the habit function key is inputted and reserving the result in the habit database.

Figure 2:
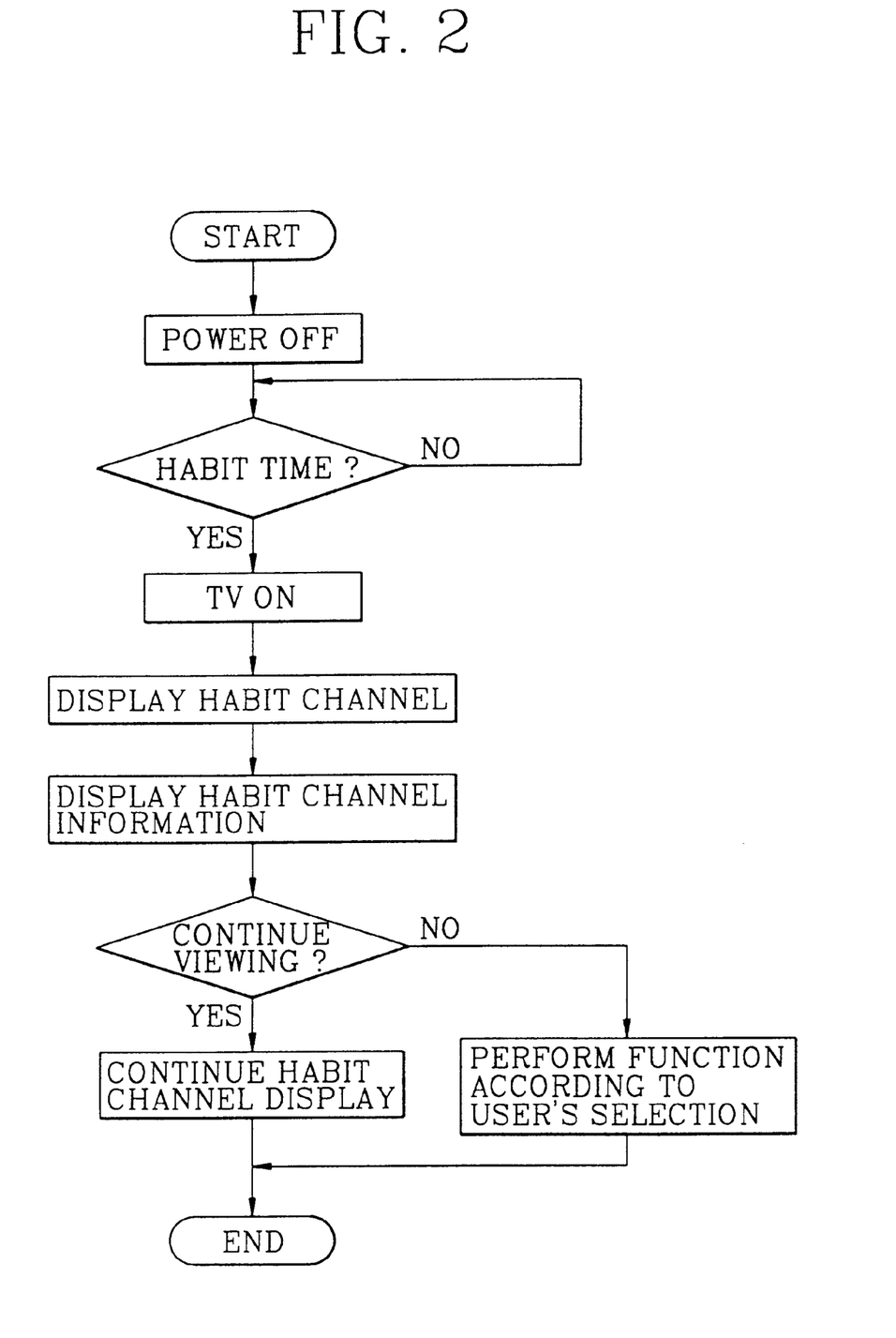

Also, FIG. 2 shows a flow chart illustrating a method of analyzing/searching a user's viewing habit regarding aerial broadcasting according to the present invention. As shown therein, the method includes a first step for displaying a habit channel by turning on TV at a time corresponding to the habit, a second step for displaying channel information corresponding to the habit after displaying the habit channel, a third step for displaying a message asking whether to continuously view, and a fourth step for maintaining the turned-on state of the habit channel in accordance with the user's selection or turning off TV.

The operation and effects of the thusly constituted present invention will now be described in further detail.

The information available from a microcomputer of TV varies only to a channel conversion time and a broadcasting channel number so that the channel conversion time and the broadcasting channel number should be recorded as habit data when a random program is recognized as habit.

Also, since a viewer does not convert channels at an identical time as recorded in the habit data on respective days of a week, a viewing time period is also recorded as habit data so as to determine a valid range to acknowledge as a habit when channels are converted at an earlier or later time than a habit data channel conversion time.

If the viewing time period is not considered, although it is an identical program to the habit data, the data is determined as a new habit when the channel conversion time does not correspond to the habit data, so that it may be recorded in the habit database. Therefore, it is essential to use the viewing time period.

Though the feeling of a habit differs from individuals, a channel selection of more than 20 minutes is acknowledged as habit. That is, the shortest program among presently aired programs is 30-minute soap operas which are daily broadcast other than sport news which usually lasts for around 10 minutes, so that if most of the programs lasting for more than 20 minutes are counted as habit, a majority of programs are included. The 20-minute program is changeable and a 10-minute program is exemplified in the present invention.

Based upon the information of channels and viewing time period which are determined as habit, a habit data is generated and stored in habit database.

At this time, the habit database is updated every day or every week. Although data is determined as habit, it should be deleted from the habit data if it is not continuously viewed. Therefore, a viewing frequency number is included in the habit data in order to determine whether to view the same in the subsequent week.

When viewing a channel which does not correspond to a habit data at a predetermined time pertaining to the range recorded in the habit data, the viewing frequency number of the habit data is decreased by one and if the viewing frequency number becomes 0, the habit data is deleted from the database.

In case of viewing the channel corresponding to the habit at a predetermined time, the viewing frequency number of the habit data is increased by one and the number of the viewing frequency is assigned by an upper limit number so as not to increase beyond the limit number.

Also, a user's reservation flag is included in the habit data so as to implement a reservation view function so that the user can directly reserve and view a desired program without regard to the habit data. While performing a comparison/search of the habit algorithm, if a data is found which has a user's reservation flag set as "1" within a present time range, the channel reserved by the user is initially shown although there exists another habit data in the habit database.

That is, when viewing a channel directly reserved by the user, the habit generated by habit algorithm of TV remains safe.

When the channel information reserved by the user is found, a message asking whether the user desires to convert the channel in the same as the case in which a general habit is found is displayed to allow the user to select whether to convert the channel.

At this time, according to the selection of the user, the channel of the main screen is converted and if there is no key input for a predetermined time period, all the message displayed on the screen is erased and maintains the present viewing channel as it is.

Here, data of different channels may exist in the same time zone at the same time so that the habit data may be filled in a memory assigned to respective days of a week. In that case, when there is generated a new habit data, a less frequently viewed data should be deleted among the existing habit data so as to record the data.

At this time, the reservation flag is employed to prevent the delete of the program reserved by the user.

In addition, data such as sound volume and image information can be added when a memory is allocated accordingly.

Figure 3:
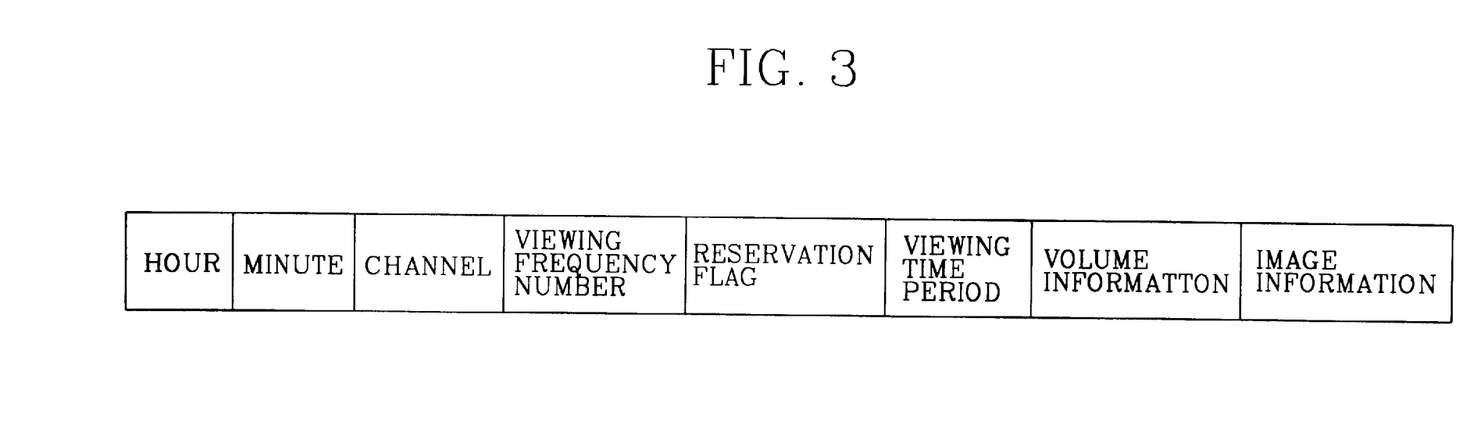
FIG. 3 is an exemplary view illustrating habit data types in FIG. 1.

The habit data types including the basic data as described above are as illustrated in FIG. 3.

In step S1, when the habit data is formed through the above steps, the microcomputer of TV compares a present time and channel with a habit database per predetermined time period as shown in FIG. 1.

With the comparison, it is determined whether there is a habit data in the habit data, which corresponds to the present time in step S2 and whether the data corresponds to the habit in step S3.

If the channel in the habit data corresponds to a channel being presently viewed, the corresponding channel is displayed.

At this time, although the viewer habitually views the same channel everyday, the channel conversion does not occur when it is the same as the habit data.

The channel can be converted earlier or later than the habit data so that all the factors should be considered when comparing with the habit data and for that purpose a viewing time of the habit data is employed.

The following explanation is used to determine whether to view a channel corresponding to the habit by comparing with the habit when there is a channel conversion by the user or record the same as a new habit.

First, when converting channels earlier than the habit data time, a time period varied to a same time zone and a different time zone.

For instance, if the channel conversion time of a habit data is at 9:10, the time zone is same when the channel is converted at 9 o'clock, and if the channel conversion time of the habit data is at 10 o'clock, the channel conversion at 9:50 belongs to a different time zone.

In case of an earlier channel conversion, the time limit is acknowledged as habit when the same channel is viewed for more than 20 minutes so that it is understood that the time 20 minutes before the conversion time of the habit data belongs to the same habit.

Figure 5:
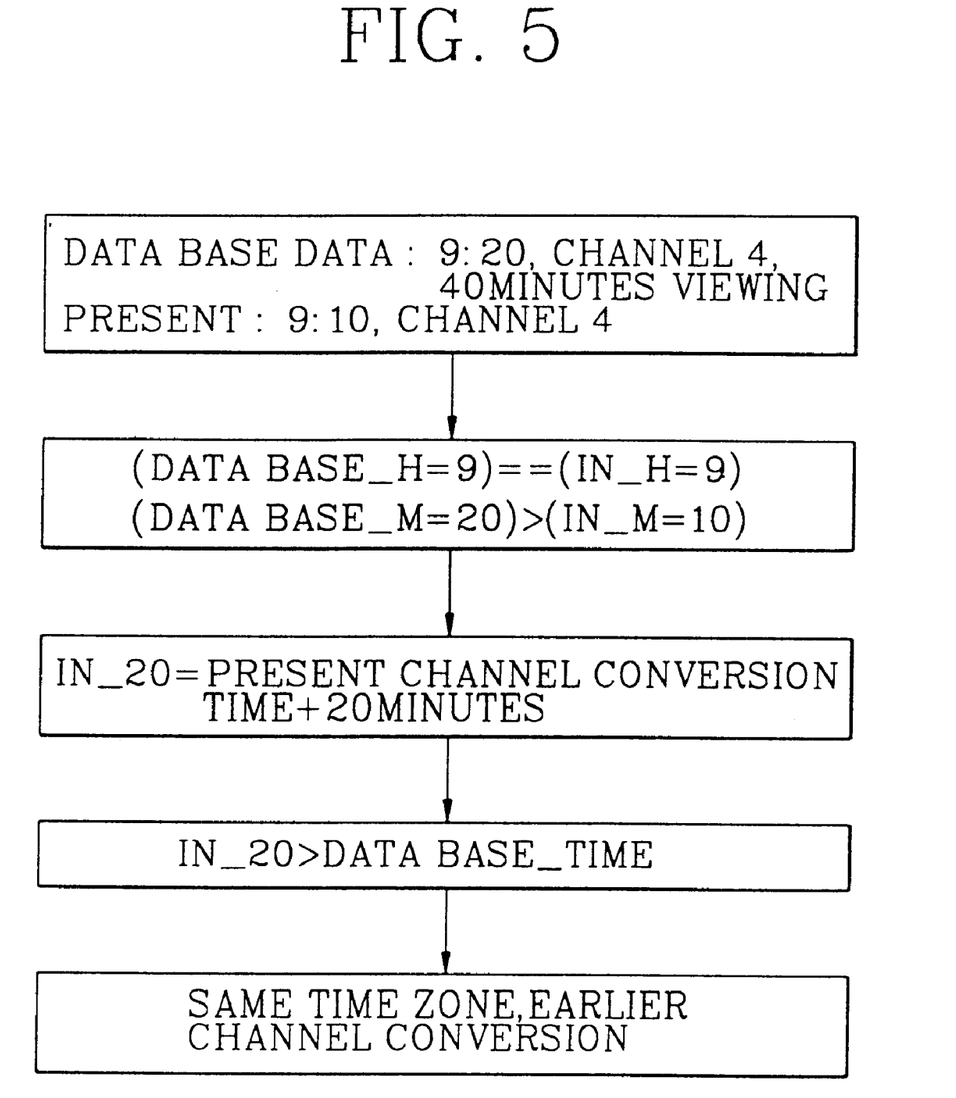
FIG. 5 is a process view illustrating a comparison/search process in case a channel is converted earlier than the habit data time.

For example, when the channel conversion time of the habit data is 9:20 in FIG. 5 and the corresponding channel is 4, viewing channel number is 1, and the viewing time is recorded as 40 minutes, if the viewer converts the present channel to channel 4 at 9:10, the habit data and the channel conversion time zone H are same, and the minute M of the habit data is larger than the present channel conversion so that it is determined that a fast channel conversion has occurred.

Accordingly, if the result of the time comparison corresponds to the earlier channel conversion, it is determined whether the channel is same as the habit data by the channel comparison.

When the channel is same as the habit data, the viewing frequency number is increased by one and when the channel is different from the habit data the viewing frequency number of the habit data is decreased by one.

In case that the channel is different, the habit database is updated since the channel viewing for more than 20 minutes is regarded as a new habit data.

Secondly, when the channel is converted later than the habit data time, the case also varies to the same time zone and different time zone.

For example, if the channel conversion time of the habit data is at 10:10 o'clock, and the viewing time is 70 minutes, the 10:40 o'clock denotes late channel conversion while remaining at the same time zone. Whereas 11:10 o'clock denotes a late channel conversion while staying at a different time zone.

Figure 6:
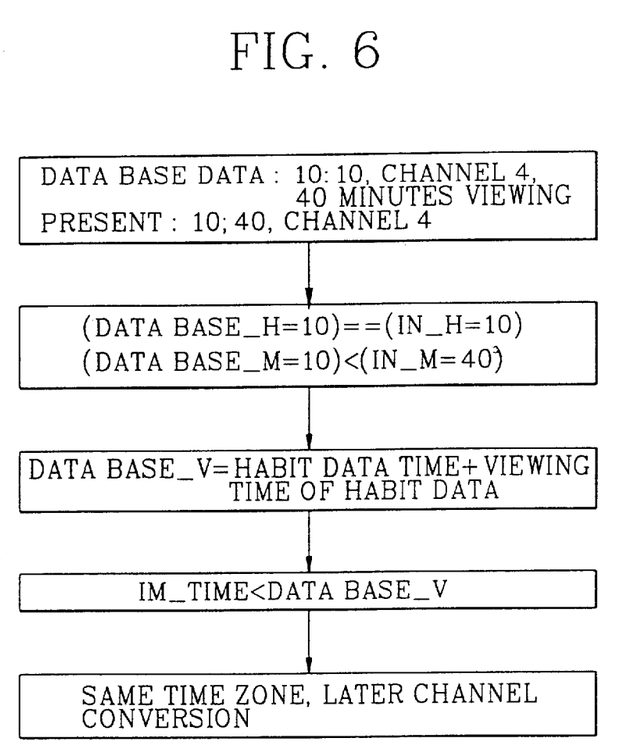
FIG. 6 is a process view illustrating a comparison/search process in case a channel is converted later than the habit data time.

For example, as shown in FIG. 6 if the channel conversion time of the habit data is at 10:10 o'clock, the corresponding channel is 4, viewing frequency number is 1 and the viewing time period is recorded as 70 minutes, when the viewer converts the present channel to channel 4 at 10:40 o'clock, the habit data and the channel conversion zone H are same and the value DB_B obtained by adding the habit and the viewing time is larger than the present channel conversion time so that it is determined that the conversion belongs to the later channel conversion.

Therefore, the result of the time comparison corresponds to the case that the later channel is converted, the channel is compared to determine whether the channel is identical to the habit data.

If the channel is the same channel as the habit channel, the viewing frequent number of the habit data is increased by one and if the channel is a different channel, the frequency number of the corresponding habit data is decreased by one.

Eventually, when the channel is same channel as the habit data in step S3, the channel conversion time point is checked in step S4.

As a result of the checking, if the conversion has occurred at the same time point, the viewing frequency number is increased by one, and a message showing that the same programs as the previous week can be viewed is displayed.

Also, as a result of the checking, if the conversion is not at the same time point, it is determined whether the channel conversion should be made earlier or later in step S6 and the subsequent channel is compared to the habit data if they are identical in step S7.

As a result of the comparison, if compared identical, the viewing frequency number is increased by one in step S8 and if not identical the viewing frequency number is decreased by one in step S9.

In step S3, if the channel is not same as the habit data, the channel information corresponding to the habit data is shown on a PIP screen in step S10 and a message asking whether the channel is converted is displayed on the screen in step S11.

Figure 8:
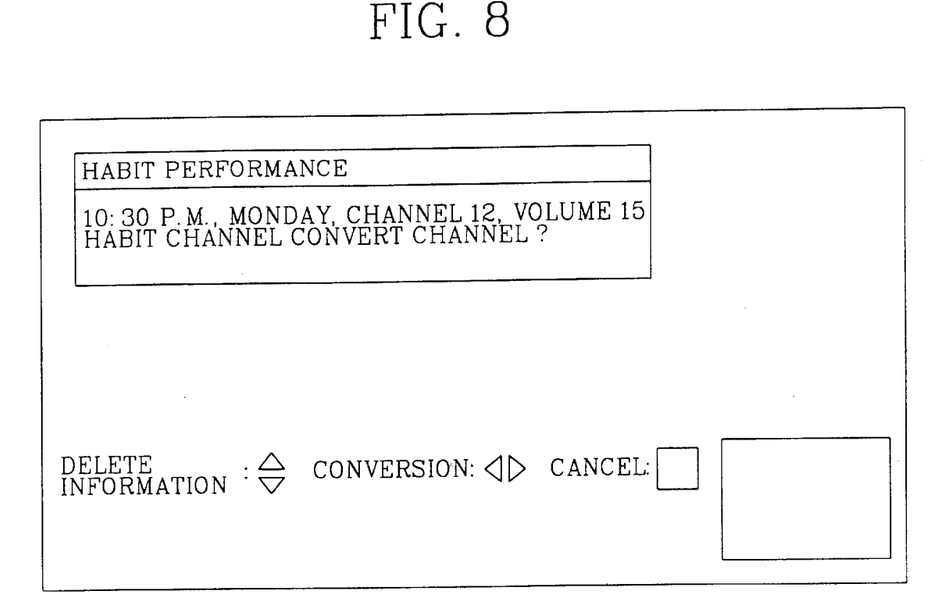
FIG. 8 is an exemplary screen view illustrating a habit channel information when viewing a channel other than the habit channel at a corresponding habit time.

That is, a habit data similar to that in FIG. 8, which is "A habit channel of channel, volume 15 at 10:30 p.m., Monday afternoon. Convert channels?" is displayed.

At this time, when the viewer converts the present channel to the habit data channel, the habit channel is displayed and when the viewer wants another channel, the present channel is converted to a desired channel.

Also, when there is nor input from the viewer for a predetermined time period, the message on the screen is erased and the present channel is maintained.

Figure 4:
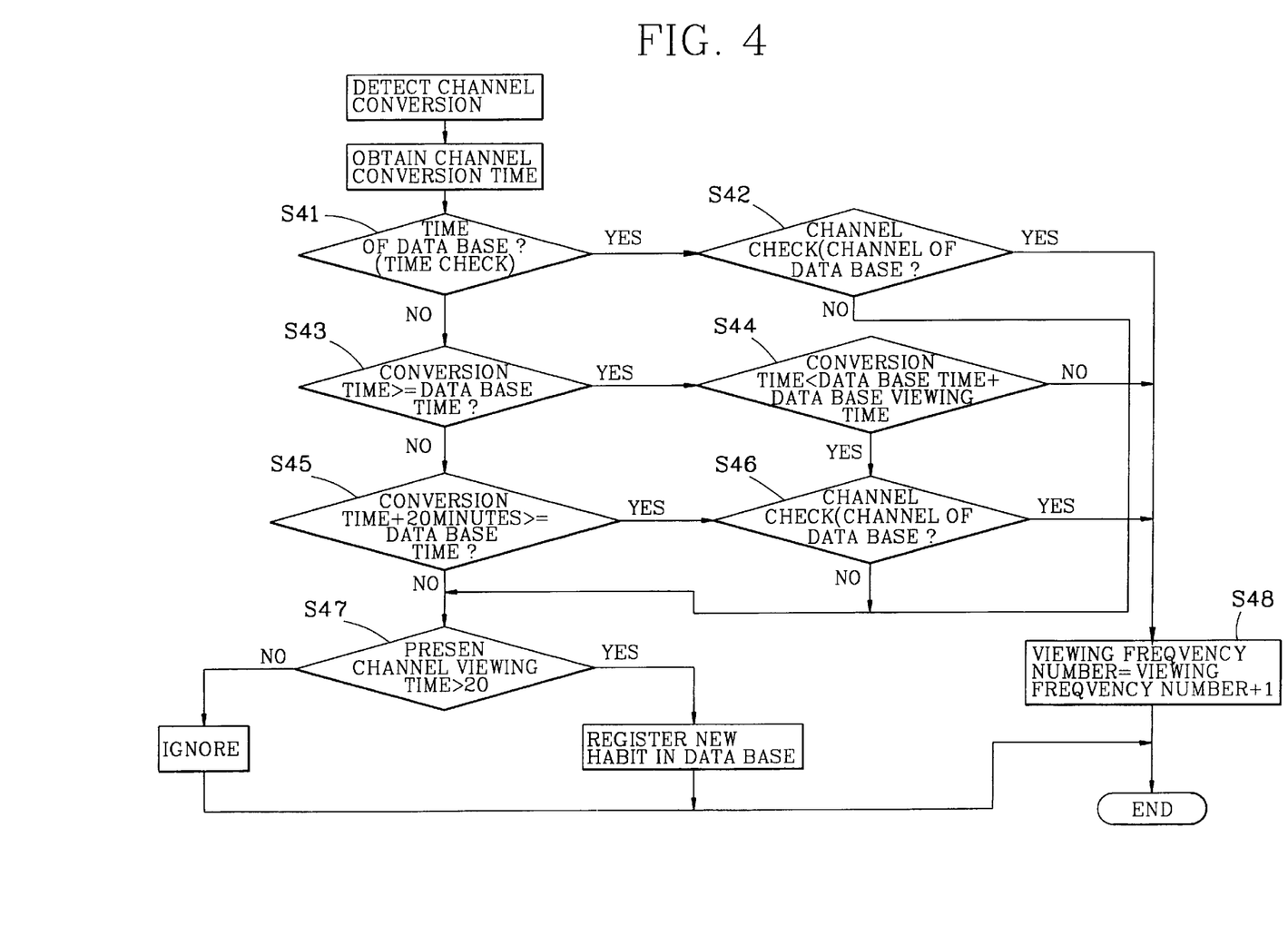
FIG. 4 is a flow chart illustrating a habit data base update process in correspondence to a channel conversion time in FIG. 2.

In step S2, if it is determined that there is no habit data which corresponds to the present time, the habit channel viewing and the habit database are updated in accordance with the channel conversion time through the same steps in FIG. 4.

That is, when the conversion time and channel data exist in the habit data by detecting the channel conversion time in step S42, it is assumed that the channel corresponding to the habit is viewed so that the viewing frequency number is increased by one in step S48.

In step S42, if the present channel is one that doesn't exist in the habit data, it is checked in step S47 whether the present channel viewing time period is more than 20 minutes and the time is more than 20 minutes a new habit is registered in the habit database and if the time is less than 20 minutes, it is ignored and terminated.

When there is no conversion time corresponding to the habit data, it is checked in step S43 whether the present channel conversion time is larger than or equal to the time of the habit data time, and if larger than or equal to the habit data time, the present channel conversion time (habit data time+habit data viewing time) is compared therewith in step S44.

As a result of the comparison, the present channel conversion time (habit data time+habit data viewing time) is larger, it means that the channel corresponding to the habit is viewed so that the viewing frequency number is increased by one and the conversion time (habit data time+habit data viewing time) of the present channel is less and belongs to the habit data channel, the step S48 is performed and if not a habit channel, the step S47 is performed.

Also, if the time obtained by adding 20 minutes to the present channel conversion time is less than the habit data time, the step S48 is preformed and if larger than or equal to the habit data time it is checked whether it belongs to the habit data channel. If the channel exists, the step S48 is preformed and, if not, the step S47 is performed.

As shown in FIG. 2, if TV is turned off at the habit time, the TV is turned on and a message is output asking whether to continue the viewing while showing the habit channel.

Figure 9:
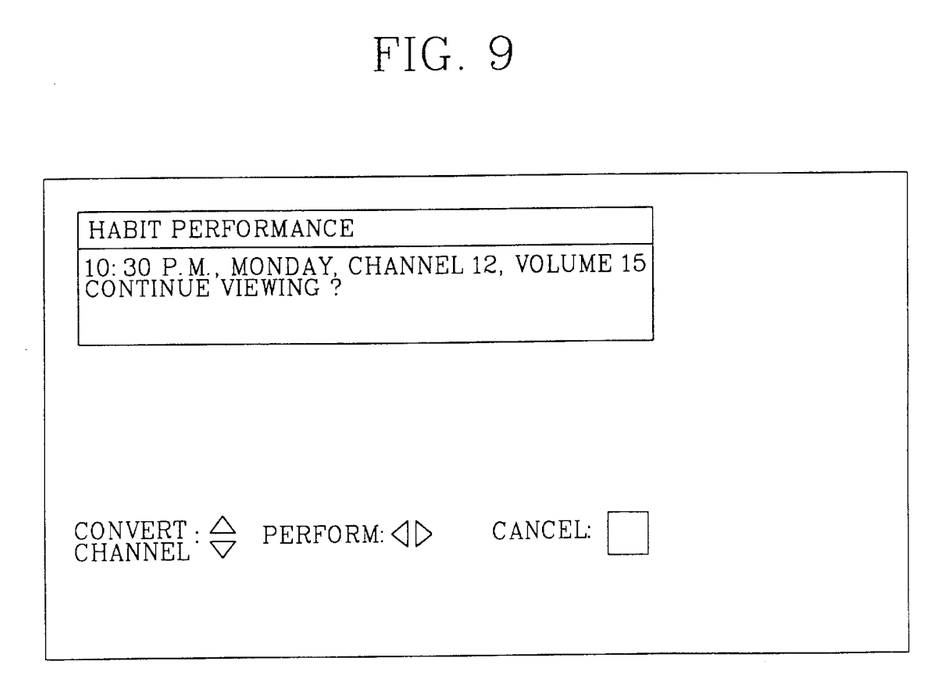
FIG. 9 is an exemplary screen view wherein the habit channel is turned on to show message when TV is turned off at the corresponding time.

That is, as shown in FIG. 9, a message that is "Continue viewing channel 12, volume 15 at 10:30 p.m. Monday ?" is displayed.

Then, according the user's selection, the present channel is maintained or converted to another or TV is turned off.

At this time, when there is no viewer's input for a predetermined time period, TV is turned off.

Figure 10A:
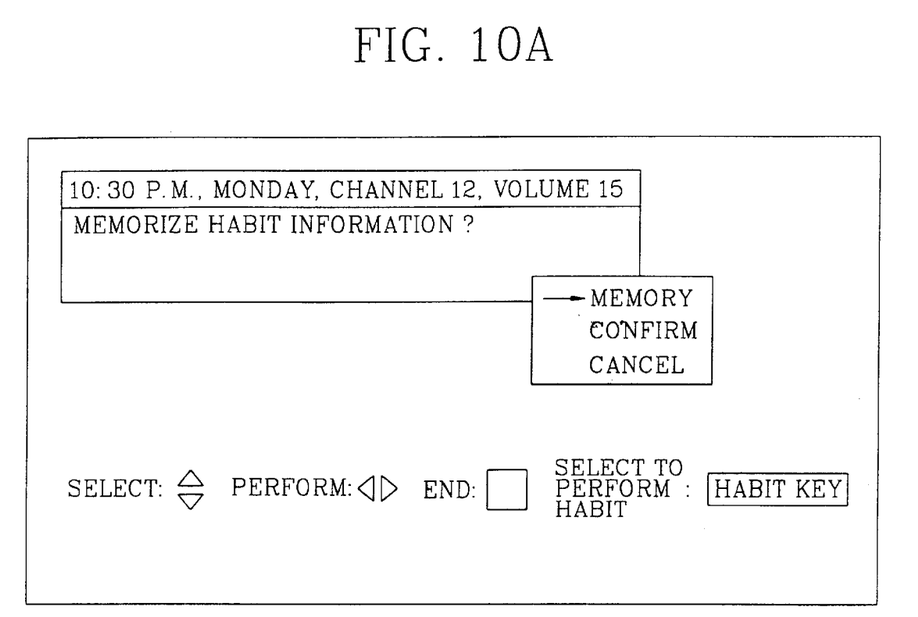
FIGS. 10A and 10B are exemplary screen views for reservation and modification in case the user pushes a habit function key while viewing TV.

When a habit function key is pressed while viewing TV, the user can directly reserve the habit. When a habit key is pressed while viewing TV, a message asking whether the present viewing channel is inputted as habit channel is displayed on the screen as shown in FIG. 10A.

Figure 10B:
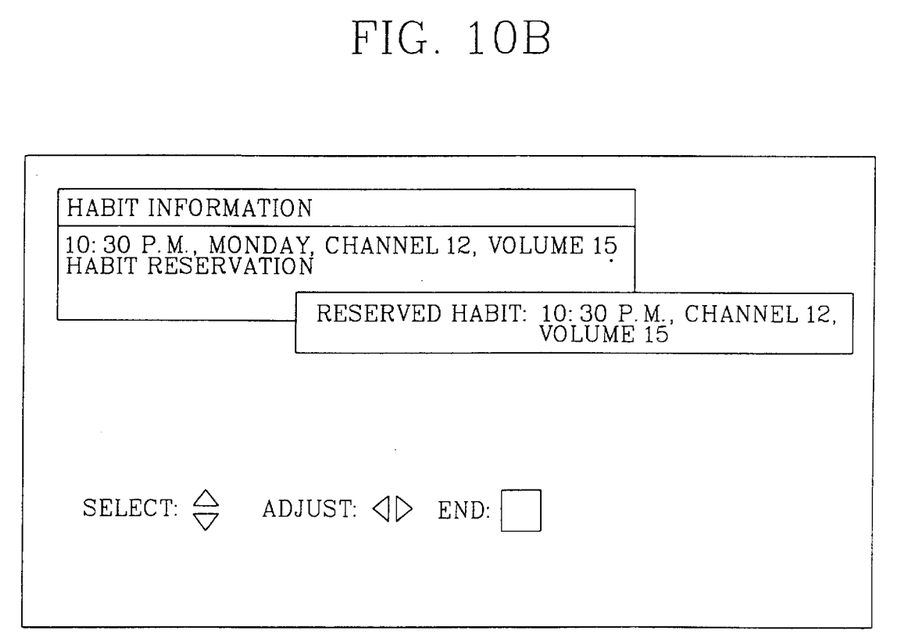

At this time, when the viewer wants to direct input, a reservation habit may be adjusted for the reservation as shown in FIG. 10B.

The habit directly reserved by the viewer is preferentially implemented prior to all the other habit data and even when the habit database is full the directly reserved habit is not deleted.

With regard to the habit data elimination, the habit data is deleted if the viewing frequency number is 0 in principle.

When the data storage memory for corresponding days of a week is full and when there is nor data wherein the viewing frequency number is 0 if a new habit data is generated, one of the preceding data should be deleted.

In this case, the sum value of all the viewing frequency number recorded in the respective time zones serves to delete one of the smallest data zone data, wherein the least viewed program among the least viewed time zone data is eliminated.

Figure 7:
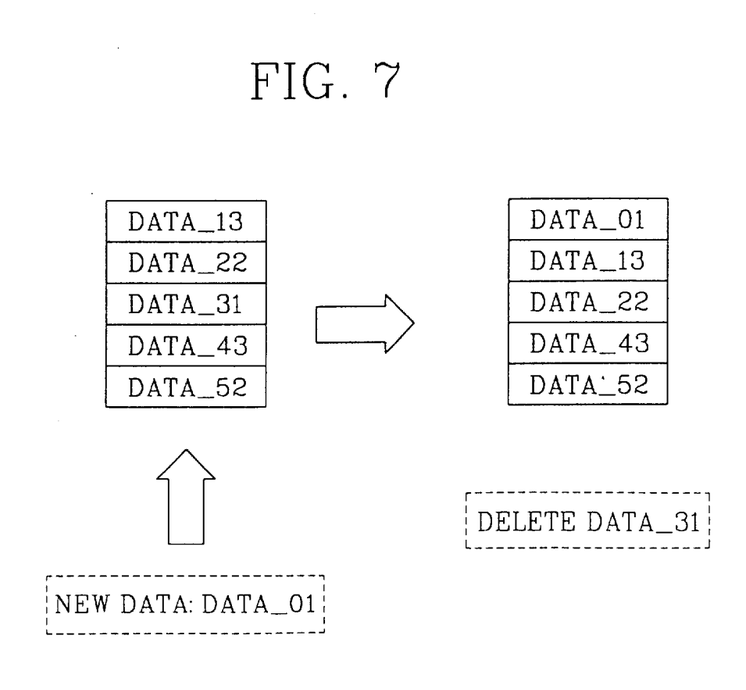
FIG. 7 is a view explaining habit data deleting process.

For example, as shown in FIG. 7, assuming that entire data number for storing as a certain day of a week is 5 and the corresponding day memory is full, the least viewed frequency number DATA_31 is deleted.

In FIG. 7, the first X of DATA_XX represents a time relation of the respective data wherein the smaller numbers denote prior time zones and correspond to channel conversion time information in real habit data. The second X represents the relation of the viewing frequency number wherein the smaller numbers denote less frequent viewing numbers and have values from 0 to less than a particular limit value in real habit data.

Also, since the user may feel uncomfortable in terms of function when the habit information is frequently displayed by habit algorithm, an utmost convenience is provided to the viewer in order for the user to select whether to perform the viewing habit algorithm itself.

The selection of the function performance is implemented such that it is toggled by pressing a remote control button for function state conversion.

Figure 12:
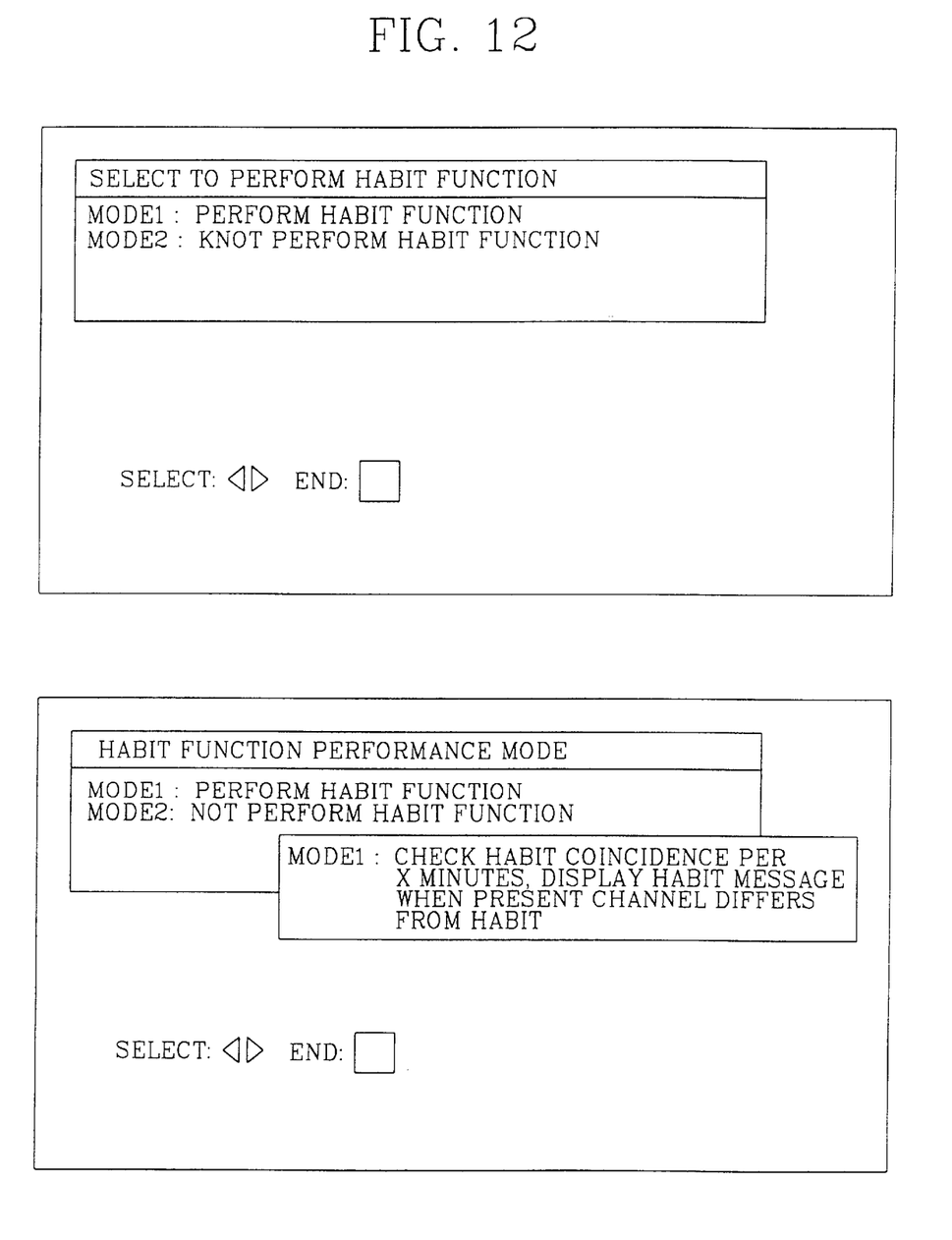
FIG. 12 illustrates a menu screen asking whether to perform the habit function displayed on the screen.

In order to employ the function, a "habit key" is pressed once more on the menu screen as shown in FIG. 10A. Then a menu screen asking whether to perform the habit function itself is displayed on the screen as shown in FIG. 12. Finally, in order to search a plurality of habit data, if the input channel conversion time does not correspond to a channel conversion time of the habit data, there may occur more than two habit data being searched by the suggested searching algorithm.

For example, if data DATA1 is in the initial habit database and a new habit data DATA2 has occurred earlier in channel conversion time, that is, within a 20-minute range at the same time zone, the updated habit database has two habit data of DATA1 and DATA2 at the same time zone.

On the same day after one week, in case that the channel is converted at the same time zone, the habit data of DATA1 is searched for earlier channel conversion at the same time zone by the suggested comparison search algorithm and the habit data of DATA2 is searched for later channel conversion at the same time zone, whereby two habit data are searched.

If there is a channel identical to the presently inputted channel among the data searched by the channel comparison, it is regarded as the same habit data So that the viewing frequency number of the same habit data is increased by one and the viewing frequency number of the other habit data among the searched habit data is decreased by one.

Figure 11:
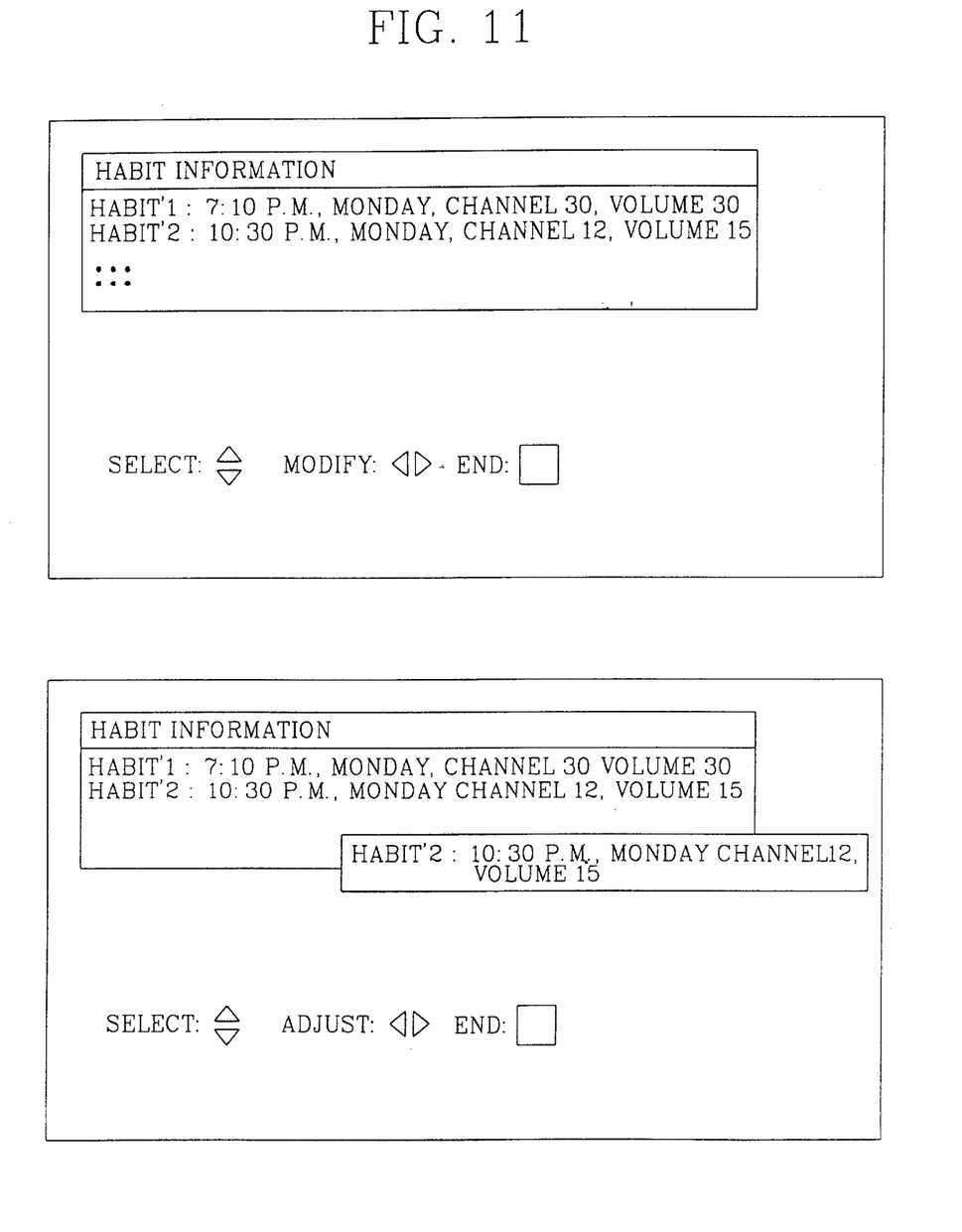
FIG. 11 illustrates the display on a screen when two or more kinds of habit data satisfy a search.

Also, if there is no habit data of the same channel among the searched habit data, it is difficult to determine a viewer's viewing habit only using channel information and conversion time information received from the microcomputer so that all the searched habit data are displayed on the screen in case of more than two kinds in consideration of a user's satisfaction, thereby enabling the user's selection for viewing such as shown in FIG.11.

As described above, the method of analyzing/searching a user's viewing habit regarding aerial broadcasting according to the present invention maximizes user's convenience, wherein a TV set provides a user with his or her habit information by analyzing/comparing habit data, present time and viewing channel per a predetermined time period after databasing a user's habit pattern by analyzing a user's viewing habit from a user's viewing channel, channel switching time, viewing time period of the channel, etc.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A method of analyzing/searching a user's viewing habit regarding broadcasting, comprising:
    a first step for comparing a present time and channel with a habit database per predetermined time period by comparing between a channel conversion time of a habit channel and a channel conversion time of a present channel;
    a second step for checking whether a present habit channel is viewed in case the present time at the first step is a time corresponding to the habit;
    a third step for terminating a search algorithm for determining the user's viewing habits when the habit channel is viewed and showing channel information corresponding to the habit by a PIP screen when the habit channel is not viewed in the second step;
    a fourth step for displaying a message asking whether the display used to view a habit channel is converted to the habit channel after showing the channel information at the third step;
    a fifth step for converting the channel at the fourth step to a channel by a user's selection;

a sixth step for checking a habit function key input when the habit channel is viewed in the second step; and a seventh step for adjusting the presently viewed channel or other channels and channel conversion time in accordance with the user's selection when the habit function key is inputted and reserving the result in the habit database;

wherein the first step further includes:

a step for determining that the present channel is the same as the habit channel in case that the channel conversion time of the present channel is faster than the channel conversion time of the habit channel; and a step for increasing a viewing frequency number by one when the present channel is the same as the habit channel and for decreasing the viewing frequency number by one when the present channel is different from the habit channel.

2. The method of claim 1, wherein the fourth step further comprises a step for eliminating all the messages on the screen and maintaining a present habit channel on the display when there is no user input.

3. The method of claim 1, wherein the method further comprises a step for reserving a channel or a channel conversion time in the habit database by adjusting the channel conversion time with the channel or another channel being presently viewed in accordance with the user's selection when a habit function key is inputted during the viewing.

4. The method of claim 1, wherein the first step further includes:

a step for determining that the present channel is the same as the habit channel in case that the channel conversion time of the present channel is later than the channel conversion time of the habit channel; and a step for increasing a viewing frequency number by one when the present channel is the same as the habit channel and for decreasing the viewing frequency number by one when the present channel is different from the habit channel.

5. A method of analyzing/searching a user's viewing habit regarding broadcasting, comprising:

a first step for comparing a present time and channel with a habit database per predetermined time period by comparing between a channel conversion time of a habit channel and a channel conversion time of a present channel;

a second step for checking whether a present habit channel is viewed in case the present time at the first step is a time corresponding to the habit;

a third step for terminating a search algorithm for determining the user's viewing habits when the habit channel is viewed and showing channel information corresponding to the habit by a PIP screen when the habit channel is not viewed in the second step;

a fourth step for displaying a message asking whether the display used to view a habit channel is converted to the habit channel after showing the channel information at the third step;

a fifth step for converting the channel at the fourth step to a channel by a user's selection;

a sixth step for checking a habit function key input when the habit channel is viewed in the second step; and a seventh step for adjusting the presently viewed channel or other channels and channel conversion time in accordance with the user's selection when the habit function key is inputted and reserving the result in the habit database;

wherein the first step further includes:

a step for determining that the present channel is the same as the habit channel in case that the channel conversion time of the present channel is faster than the channel conversion time of the habit channel; and a step for increasing a viewing frequency number by one when the present channel is the same as the habit channel and for decreasing the viewing frequency number by one when the present channel is different from the habit channel.

6. The method of claim 5, wherein the fourth step further comprises a step for eliminating all the messages on the screen and maintaining a present habit channel on the display when there is no user input.

* * * * *